(12) United States Patent
Coyle et al.

(10) Patent No.: US 7,318,029 B2
(45) Date of Patent: Jan. 8, 2008

(54) METHOD AND APPARATUS FOR A INTERACTIVE VOICE RESPONSE SYSTEM

(75) Inventors: Wendy-Ann Coyle, Eastleigh (GB); Stephen James Haskey, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 774 days.

(21) Appl. No.: 10/660,900

(22) Filed: Sep. 12, 2003

(65) Prior Publication Data
US 2004/0176953 A1 Sep. 9, 2004

(30) Foreign Application Priority Data
Oct. 24, 2002 (GB) ................. 0224806.0

(51) Int. Cl.
G10L 15/04 (2006.01)
G10L 15/22 (2006.01)

(52) U.S. Cl. ...................... 704/231; 704/236
(58) Field of Classification Search ........... 704/231, 704/236, 241, 251, 253, 256.4, 275
See application file for complete search history.

(56) References Cited

U.S. PATENT DOCUMENTS

| 5,621,849 | A | * | 4/1997 | Sakurai et al. ............ 704/241 |
|---|---|---|---|---|
| 5,687,288 | A | * | 11/1997 | Dobler et al. ............ 704/255 |
| 6,226,615 | B1 | * | 5/2001 | Kirby et al. .............. 704/272 |
| 6,295,391 | B1 | * | 9/2001 | Rudd et al. .............. 382/313 |
| 6,314,396 | B1 | | 11/2001 | Monkowski |
| 6,430,551 | B1 | * | 8/2002 | Thelen et al. ............. 707/3 |
| 6,539,359 | B1 | * | 3/2003 | Ladd et al. .............. 704/275 |
| 6,629,072 | B1 | * | 9/2003 | Thelen et al. ............ 704/251 |
| 7,167,544 | B1 | * | 1/2007 | Bauer .................. 379/88.01 |
| 2002/0013701 | A1 | * | 1/2002 | Oliver et al. ............ 704/231 |
| 2002/0019734 | A1 | * | 2/2002 | Bartosik ................ 704/231 |
| 2003/0028375 | A1 | * | 2/2003 | Kellner ................. 704/235 |
| 2004/0078198 | A1 | * | 4/2004 | Hernandez-Abrego et al. .. 704/231 |
| 2007/0185704 | A1 | * | 8/2007 | Yoshimura et al. ........... 704/10 |

* cited by examiner

Primary Examiner—Martin Lerner
(74) Attorney, Agent, or Firm—Akerman Senterfitt

(57) ABSTRACT

There is disclosed an interactive voice response system for prompting a user with feedback during speech recognition. A user who speaks too slowly or too quickly may speak even more slowly or quickly in response to an error in speech recognition. The present system aims to give the user specific feedback on the speed of speaking. The method can include: acquiring an utterance from a user; recognizing a string of words from the utterance; acquiring for each word the ratio of actual duration of delivery to ideal duration; calculating an average ratio for all the words wherein the average ratio is an indication of the speed of the delivery of the utterance; and prompting the user as to the speed of delivery of the utterance according to the average ratio.

9 Claims, 6 Drawing Sheets

GB920020053US1

| 500 | A | B | C | D | E |
|---|---|---|---|---|---|
| 1 | WORD | RECOGNITION SCORE | ACTUAL DURATION | IDEAL DURATION | DURATION RATIO |
| 2 | EIGHT | 82% | 350 | 450 | 0.78 |
| 3 | SEVEN | 95% | 370 | 460 | 0.80 |
| 4 | SIX | 85% | 270 | 350 | 0.77 |
| 5 | FIVE | 89% | 300 | 400 | 0.75 |
| 6 | AVERAGE RECOGNITION SCORE | 88% | | AVERAGE DURATION RATIO | 0.78 |

FIG. 5A

| 500 | A | B | C | D | E |
|---|---|---|---|---|---|
| 1 | WORD | RECOGNITION SCORE | ACTUAL DURATION | IDEAL DURATION | DURATION RATIO |
| 2 | XXX | 50% | 700 | 350 | x |
| 3 | THREE | 95% | 940 | 450 | 2.1 |
| 4 | TWO | 85% | 650 | 350 | 1.9 |
| 5 | ONE | 75% | 510 | 300 | 1.7 |
| 6 | AVERAGE RECOGNITION SCORE | 76% | | AVERAGE DURATION RATIO | 1.9 |

FIG. 5B

| SLOW | NORMAL | QUICKL |
|---|---|---|
| UTTERANCE 1 | UTTERANCE 2 | UTTERANCE 2 |
| "FOUR THREE TWO ONE" | "FOUR THREE TWO ONE" | "FOUR THREE TWO ONE" |
| 1. SPELLING = 4<br>SCORE = 50%<br>START TIME = 170<br>END TIME = 870<br>ACTUAL DURATION = 700<br>IDEAL DURATION = 350 | 1. SPELLING = 4<br>SCORE = 95%<br>START TIME = 220<br>END TIME = 580<br>ACTUAL DURATION = 360<br>IDEAL DURATION = 350 | 1. SPELLING = 4<br>SCORE = 60%<br>START TIME = 240<br>END TIME = 430<br>ACTUAL DURATION = 190<br>IDEAL DURATION = 350 |
| 2. SPELLING = 3<br>SCORE = 95%<br>START TIME = 870<br>END TIME = 1810<br>ACTUAL DURATION = 940<br>IDEAL DURATION = 450 | 2. SPELLING = 3<br>SCORE = 97%<br>START TIME = 580<br>END TIME = 1020<br>ACTUAL DURATION = 440<br>IDEAL DURATION = 450 | 2. SPELLING = 3<br>SCORE = 70%<br>START TIME = 430<br>END TIME = 670<br>ACTUAL DURATION = 240<br>IDEAL DURATION = 450 |
| 3. SPELLING = 2<br>SCORE = 85%<br>START TIME = 2080<br>END TIME = 2730<br>ACTUAL DURATION = 650<br>IDEAL DURATION = 350 | 3. SPELLING = 2<br>SCORE = 93%<br>START TIME = 1020<br>END TIME = 1350<br>ACTUAL DURATION = 330<br>IDEAL DURATION = 350 | 3. SPELLING = 2<br>SCORE = 70%<br>START TIME = 670<br>END TIME = 900<br>ACTUAL DURATION = 230<br>IDEAL DURATION = 350 |
| 4. SPELLING = 1<br>SCORE = 75%<br>START TIME = 2830<br>END TIME = 3340<br>ACTUAL DURATION = 510<br>IDEAL DURATION = 300 | 4. SPELLING = 1<br>SCORE = 94%<br>START TIME = 1350<br>END TIME = 1640<br>ACTUAL DURATION = 290<br>IDEAL DURATION = 300 | 4. SPELLING = 1<br>SCORE = 70%<br>START TIME = 900<br>END TIME = 1170<br>ACTUAL DURATION = 270<br>IDEAL DURATION = 300 |

FIG. 6

METHOD AND APPARATUS FOR A INTERACTIVE VOICE RESPONSE SYSTEM

CROSS-REFERENCE TO RELATED APPLICATIONS

This application claims the benefit of U.K. Patent Application No. 0224806.0, filed in the U.K. Patent Office on Oct. 24, 2002.

BACKGROUND OF THE INVENTION

1. Field of Invention

This invention relates to a method and apparatus for an interactive voice response system.

2. Description of the Related Art

A telephone can be used to place a catalogue order; check an airline schedule; query a price; review an account balance; notify a customer; record and retrieve a message; and many other business interactions. Often, each telephone call involves a service representative talking to a user, asking questions, entering responses into a computer, and reading information to the user from a terminal screen. This process can be automated by substituting an interactive voice response system (IVR) with an ability to play voice prompts and receive user input e.g. from speech recognition or from DTMF tones.

The interaction of the voice prompts and user input is guided by a voice application that in turn is executed by the IVR. Voice applications have been written in script, state code, Java™, and voice extensible mark up language (VoiceXML). Java™ and all Java™ based trademarks and logos are trademarks or registered trademarks of Sun Microsystems, Inc in the United States, other countries or both.

When a known user speaks correctly, clearly and in a good quiet environment, an IVR speech recognition engine trained in the speech of the user has little problem understanding the speech utterances. However, if the speech differs too much from the data that was used to train the speech recognition engine then understanding the speech can be difficult. When the system cannot correctly recognize an utterance it is usual for the engine to prompt the user to repeat the utterance. However, if the user is unaware of how to help the IVR he can compound the problem. For instance it may be that the user is speaking too slowly in the first place and speaking even more slowly will compound the problem. This is because it is human nature to speak louder, slower or in an over pronounced way when not initially understood. This can often be heard when a tourist abroad tries to speak, in their native tongue, to a foreigner. This may help when speaking to a human but usually has the opposite effect when speaking to a machine.

U.S. Pat. No. 6,314,396 discloses a system for automatic gain adjustment in a speech recognition system and returns a signal to noise ratio to a user with the intention of achieving a better speech recognition accuracy.

Therefore, although it is known to give feedback to a user as to the signal to noise ratio, no-one has disclosed feedback concerning the speed at which a user is speaking.

SUMMARY OF THE INVENTION

According to a first aspect of the present invention there is provided an interactive voice response system including: a prompt acquisition component for acquiring an utterance from a user; a speech recognition engine for recognizing a plurality of words from the utterance; a custom server for comparing the actual duration of the utterance with an ideal duration of the recognized words; and a prompt play component for prompting the user as to the speed of delivery of the utterance according to the results of the comparison.

In this way, data available from a speech recognition engine is used to estimate the speed at which the user is speaking by comparing an ideal duration of the recognized words (as stored with the model of the speech data in the speech recognition engine) with the actual duration of the spoken words.

Preferably the means for comparing the actual duration of the utterance with an ideal duration of the recognized words include means for acquiring for each word the actual duration of delivery and ideal duration and means for comparing the differences in actual duration and ideal duration for each word. This solution breaks an utterance down into component words and calculates a difference for each word and then finds the average of all the words. The advantage is that for each recognized word there already exists an ideal duration value in the speech model. The means for acquiring and the means for comparing are defined in the duration custom server.

Advantageously, the means for comparing the difference between actual duration and ideal duration of each word includes: calculating the ratio of actual duration and ideal duration for each word wherein the ratio is an indication of the speed of delivery of the utterance. Using a ratio allows relative comparisons rather than an absolute comparison which would compare small words differently than large words.

More advantageously the means for comparing the actual duration of the utterance with an ideal duration of the recognized words includes calculating an average of the ratio of words as an indication of the speed of delivery of the utterance. Such an average allows a comparison to view the whole picture rather than individual ratios which may on their own distort any conclusion.

Advantageously, each word has an associated recognition score and the ratio of a word is only used in the average calculation if the associated recognition score is above a lower threshold recognition score. As the overall recognition score for an utterance diminishes, then the reliability of having the correct word with corresponding duration also diminishes.

If the total actual duration is greater than the total ideal duration then a prompt that the user is speaking too slow might help the next acquisition. If the total actual duration is less than the total ideal duration then a prompt that the user is speaking too fast might likewise help.

Most preferably the means for prompting the user only operates if the actual duration and the ideal duration differ by more than a de minimus value. This solution bypasses the prompt for feedback when there are few problems with the recognition. If the recognition is perfect then the user will become annoyed at hearing prompts to speak faster or slower.

Advantageously, the system further comprises means for re-acquiring the utterance from the user in case the original utterance cannot be identified.

According to a second aspect of the invention there is provided a method in an interactive response system including: acquiring an utterance from a user; recognizing a plurality of words from the utterance; comparing the actual duration of the utterance with an ideal duration of the recognized words; and prompting the user as to the speed of delivery of the utterance according to the results of the comparison.

According to a third aspect of the invention there is provided a computer program product for processing one or more sets of data processing tasks, said computer program product comprising computer program instructions stored on a computer-readable storage medium for, when loaded into a computer and executed, causing a computer to carry out the steps of: acquiring an utterance from a user; recognizing a plurality of words from the utterance; comparing the actual duration of the utterance with an ideal duration of the recognized words; and prompting the user as to the speed of delivery of the utterance according to the results of the comparison.

BRIEF DESCRIPTION OF THE DRAWINGS

In order to promote a fuller understanding of this and other aspects of the present invention, an embodiment of the invention will now be described, by means of example only, with reference to the accompanying drawings in which:

FIGS. 5A and 5B are example utterances as stored in an utterance database according to a preferred embodiment of the present invention; and FIG. 6 is a table of data received from a speech recognition engine according the preferred embodiment of the present invention.

DETAILED DESCRIPTION OF THE INVENTION

Figure 1:
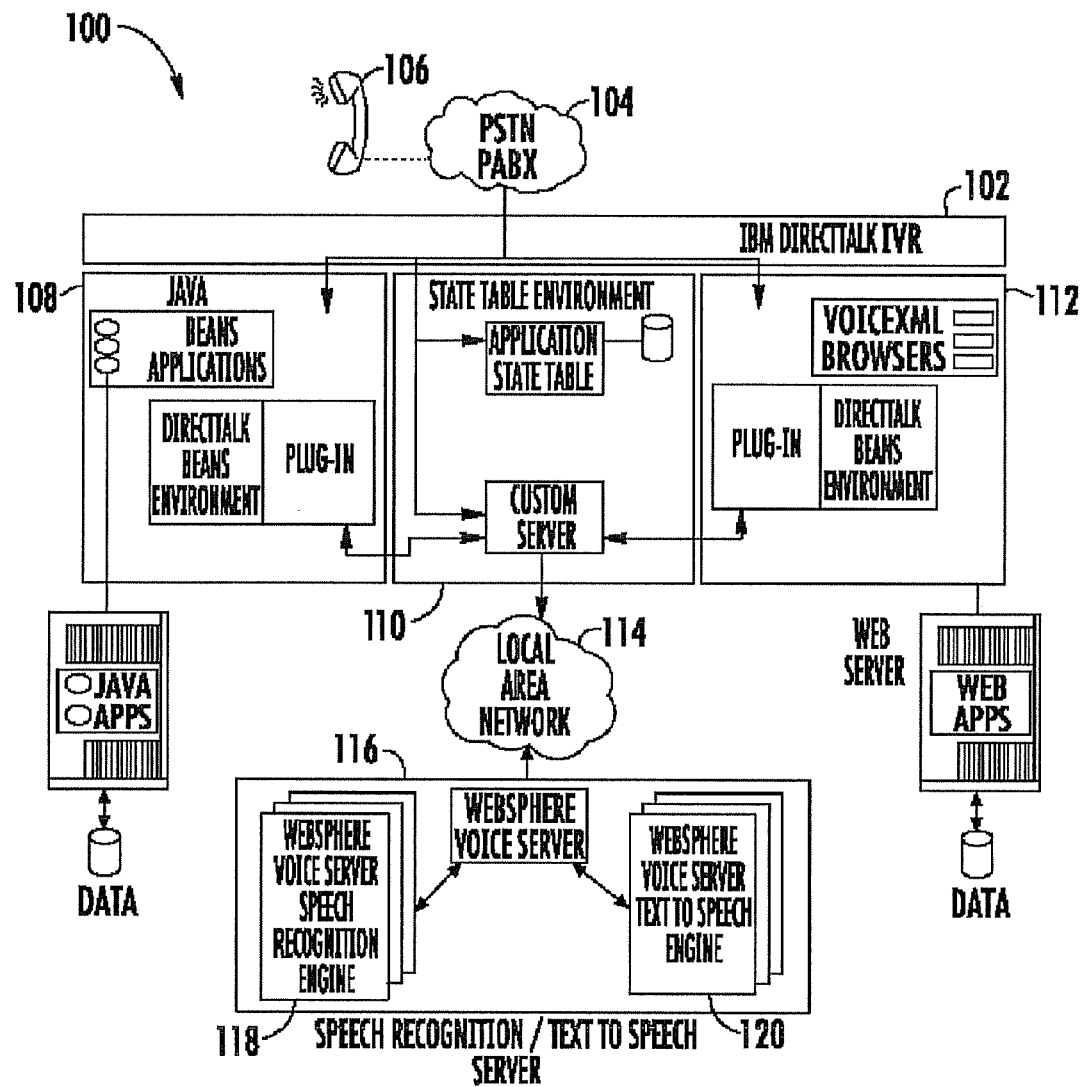
FIG. 1 is a schematic of a voice telephony system.

According to FIG. 1 there is shown a schematic of a voice telephony in which the present invention can be embodied. Voice telephony system 100 comprises an interactive voice response system (IVR) 102 connected to a voice server 116 over a LAN 114. An example of IVR 102 is IBM WebSphere™ Voice Response 3.1 (WVR) for AIX™ based on IBM DirectTalk™ Technology 102. An example of voice server 116 is IBM™ Voice Server. A user uses a telephone 106 to connect with IVR 102 through telephony (PSTN) switch (PABX) 104. IVR 102 uses any one of its three application languages to control a voice interaction. Java application layer 108 uses Java Beans and Java applications to control the IVR 102. State table environment 110 hosts the original DirectTalk application programming language and is based on state table applications and custom servers. VoiceXML application layer 112 uses VoiceXML browsers and VoiceXML applications in Web Servers to control the IVR 100.

IVR 102 is well-suited for large enterprises or telecommunications businesses. It is scalable, robust and designed for continuous operation 24 hours a day and 7 days a week. IBM WebSphere™ Voice Response 3.1 for AIX™ can support between 12 and 480 concurrent telephone channels on a single system. Multiple systems can be networked together to provide larger configurations. AIX™ DirectTalk™, IBM™, pSeries™ and WebSphere™ are trademarks of International Business Machines in the United States, other countries, or both.

The preferred embodiment uses WebSphere™ Voice Response for AIX™ 3.1 which supports from 1 to 16 E1 or T1 digital trunks on a single IBM pSeries™ server with up to 1,500 ports on a single system. Up to 2,304 telephony channels using T1 connections or 2,880 telephony channels using E1 connections can be supported in a 19" rack. WebSphere™ Voice Response for AIX™ 3.1 requires an IBM AIX™ v 4.3 operating system running on an IBM pSeries™ computer. It supports network connectivity on multiple networks including PSTN, ISDN, CAS, SS7, VoIP networks. The preferred embodiment is concerned with those networks which provide a user identification number with an incoming call e.g. ISDN and SS7.

Voice server 116 provides voice processing capacity to the telephony base of IVR 102 in the form of speech recognition engine 118 and text-to-speech engine 120.

The speech recognition engine 118 analyzes input audio using individual pronunciation models for all words in an active vocabulary, including a word representing <silence>. The engine analyzes the audio by fitting it to a mathematical pronunciation model of words in all possible word sequences specified as possible by the vocabulary's language model. The fining process includes computing a distribution for when each word begins and ends, with the most probable transition points of each distribution reported as the word boundaries. The quality of the mathematical fit between word models and input audio is used together with the language model probability for each word in a particular sequence and several other parameters of the decoding process to compute word scores. During runtime the engine creates these metrics (start time, end time and score) for every word which are passed to the voice custom server along with the recognized word result. An ideal duration time metric of the recognized word result is based on the speech recognition language model. Each phoneme in the language model has an associated ideal duration time and the duration time for a recognized word is the sum of the durations for the phonemes in the recognized word. Normally only the recognized word result is sent to the IVR but the other metrics are available on demand. In the present embodiment the IVR requests all the above metrics with each utterance it sends to the speech recognition engine.

Figure 2:
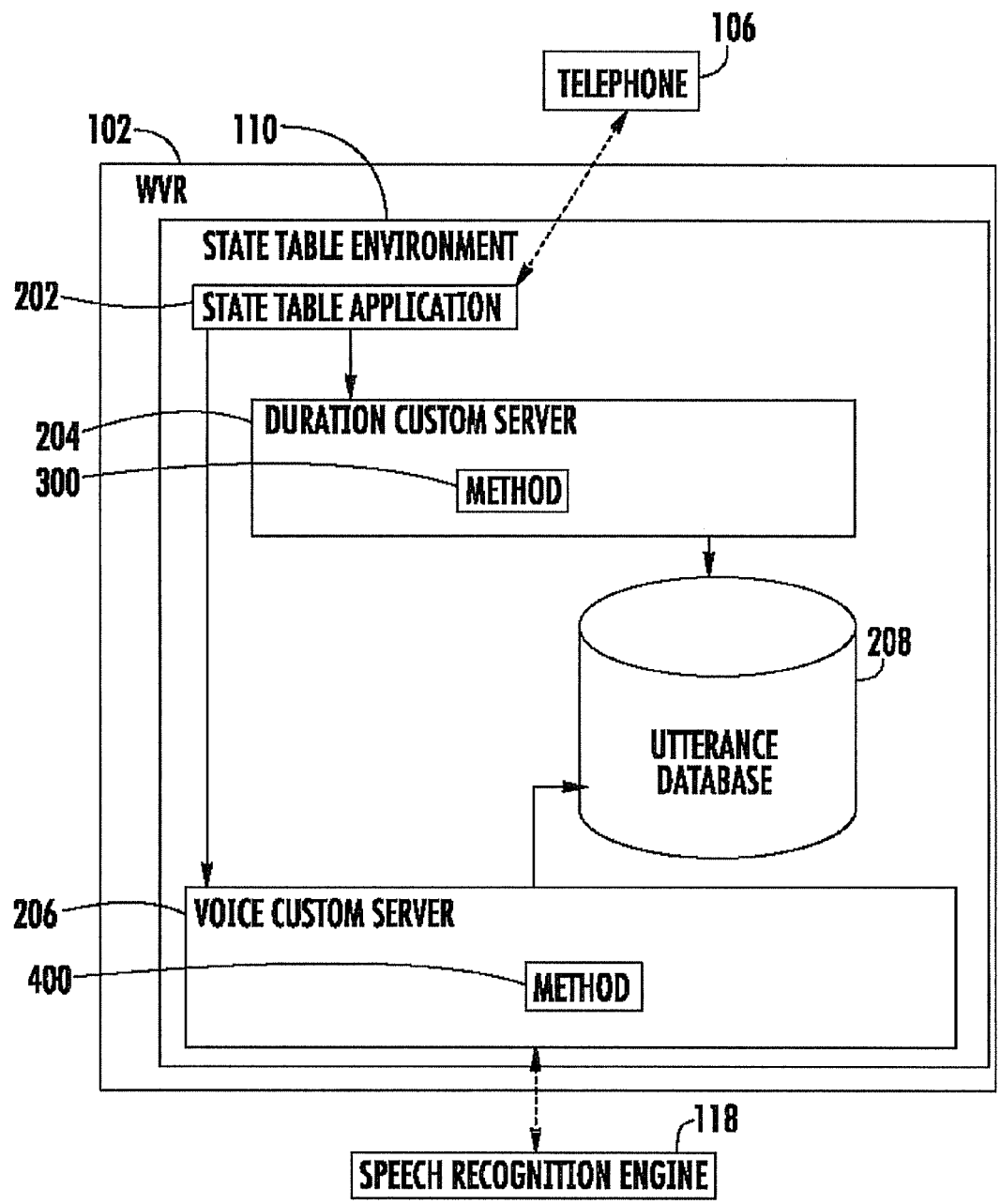
FIG. 2 is a more detailed schematic of the IVR system of the preferred embodiment of the present invention.

Referring to FIG. 2, state table "environment 110 of IVR 102 includes: a state table application 202; a duration custom server 204; a voice custom server 206 and an utterance database 208. State table application 202 controls a voice interaction on the IVR 102 when a voice channel from a telephone is opened. The state table application 202 performs application method 300 which is described in relation to FIG. 3. Voice custom server 206 provides the interface to the speech recognition engine 118 and the text-to-speech engine 120 on voice server 116. Voice custom server 206 places the results of speech recognition into the utterance database 208 after a request from the state table application 202. The results of the speech recognition include: the recognized words of the utterance; a recognition score for each word; an actual duration for each word; and an ideal duration for each word as used in the speech recognition model. Utterance database 208 receives the results of speech recognition from voice custom server 206 and further processing is performed on the results by duration custom server 204. An example of the results and further processing is shown in FIGS. 5A and 5B. Duration custom server 204 acquires the data in utterance database 208 and compares the spoken duration of the actual word in an utterance with the ideal duration, this is further described with reference to duration custom server method 400 of FIG. 4.

Figure 3:
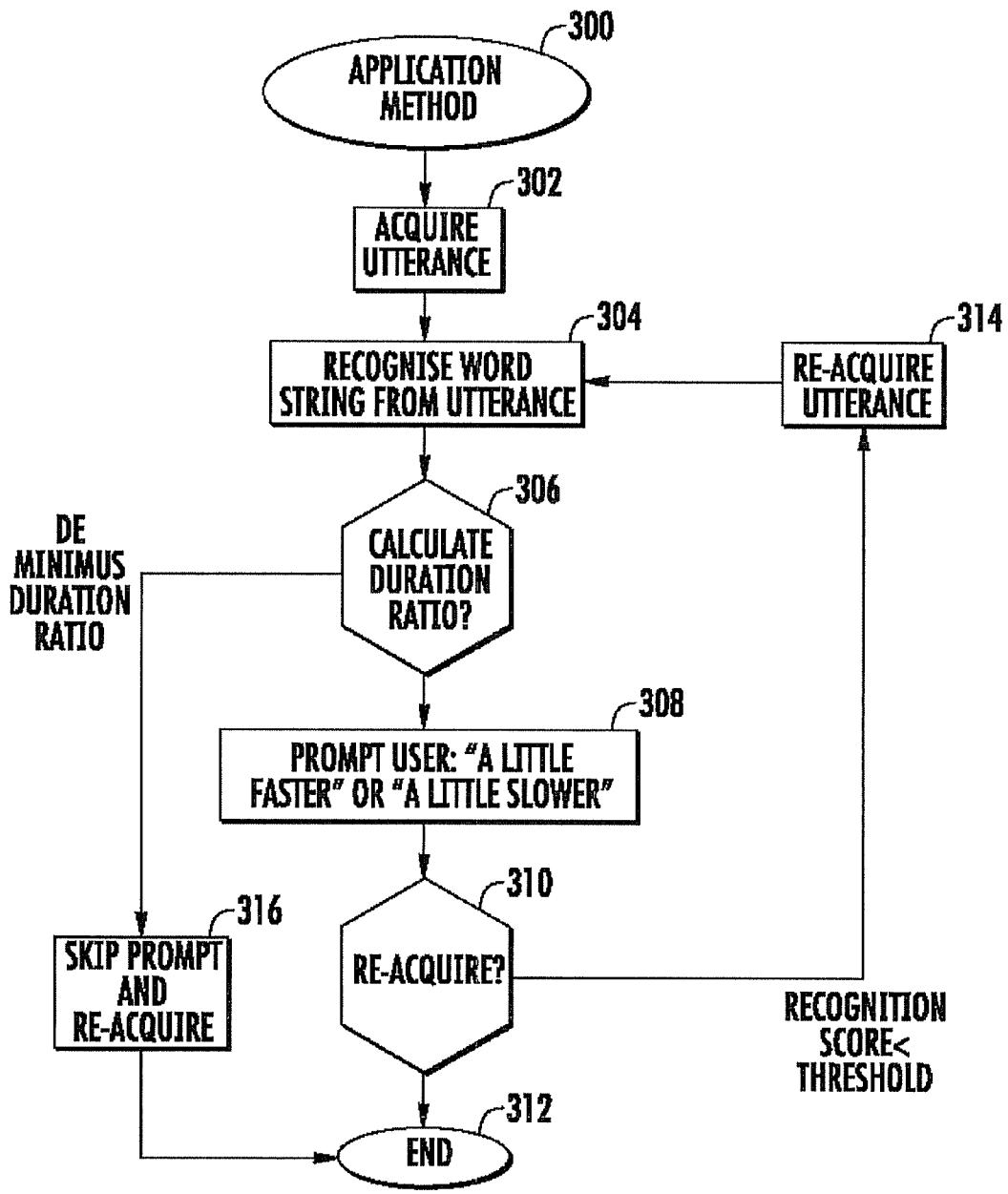
FIG. 3 is a schematic application process of the preferred embodiment of the present invention.

Referring to FIG. 3, method 300 performed by state table application 202 is described in more detail. The first step is acquiring an utterance (step 302) from a user connected to the IVR 100 after prompting the user to speak into the telephone. Recognizing a word string from an utterance (step 304) is performed through the custom voice server 206 using the voice server 116 and speech recognition engine 118. The results of the recognition are placed into the utterance database 208. Step 306 calculates a duration ratio. A comparison of the actual duration of utterance with an ideal duration of recognized words is performed by duration custom server 204 by acquiring the values from the utterance database 208. The duration custom server also calculates an average recognition score for the whole utterance which is computed using an average of the recognition scores for all of the words. In step 308, the state table application 202 prompts the user with "please speak a little faster next time" or "please speak a little slower next time" depending on the duration ratio. In this example a duration ratio of more than one is an indication that the user is speaking slower than the ideal speed. A duration ratio of less than one indicates that the user is speaking faster than the ideal speed. The application then re-acquires the utterance (step 310) if there are words with recognition scores below a lower threshold recognition score, that is below 60%. A lower threshold recognition score is different for each speech recognition engine and configuration of the engine so, by way of example only, 60% is taken as the lower threshold recognition score to explain the embodiment. If there are words in the utterance database with recognition scores below 60% then the application re-acquires the utterance at step 314. Otherwise the method finishes at step 312 and continues with the remainder of the state table application accepting or rejecting the recognized words. In normal operation re-acquisition is only performed once or twice and the best result is used or the result is negated. Step 316 skips prompt step 308 and the re-acquire step 310 if there is no need to prompt the user to speak slower or quicker. This situation occurs when the duration ratio is within a de minimus value, for example between 1.2 and 0.80 but also when the overall recognition value is above an upper threshold recognition score, for example 90%.

Figure 4:
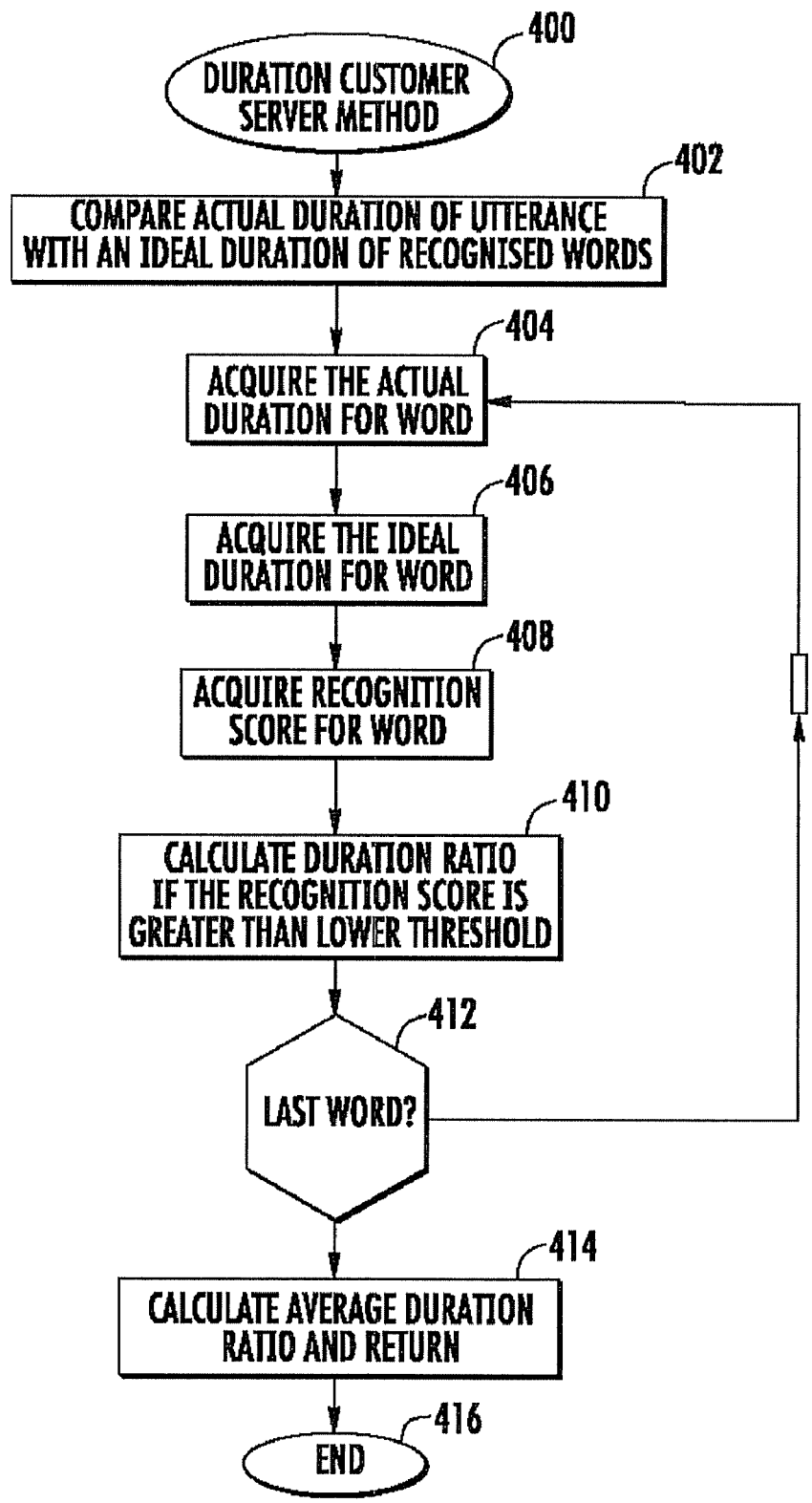
FIG. 4 is a schematic custom server process of the preferred embodiment of the present invention.

Referring to FIG. 4, method 400 of the duration custom server 204 is described. The state table application 202 calls the duration custom server 204 after an utterance has been recorded to compare actual duration of the utterance with an ideal duration of the recognized words (step 402). The actual duration in seconds is acquired for the first word (step 404) from the utterance database 208. Then the ideal duration in seconds for the first word is acquired (step 406) from the utterance database 208. The recognition score for the first word is acquired (step 408) from the utterance database 208. If the individual recognition score for the word is greater than the lower threshold recognition score (60%) then the duration ratio is calculated (step 410) by dividing the actual duration by the ideal duration. If the word is not the last word then the process re-starts at step 404 with the next word in the utterance (step 412). If the word is the last word then an average duration ratio is calculated for words with a recognition score above the lower threshold recognition score (step 414). Method 400 ends at step 416.

The tables in FIG. 5A and FIG. 5B are example utterance sets of words as stored in the utterance database according to a preferred embodiment of the present invention. Referring to FIG. 5A there is shown table 500 including: recognized words in column A; a recognition score for each word in column B; the actual duration of each word as estimated by the recognition engine 118 in column C; the ideal duration of each word is modeled by the recognition engine 118 in column D; and the duration ratio as calculated by the duration custom server, in column B. Cell B6 of table 500 is the average recognition score calculated by taking an average of all the individual recognition scores. Cell E6 of table 500 is the average of all the duration ratios with acceptable recognition scores as calculated by the duration custom server.

FIG. 5B shows table 502 which has the same column, row and cell definitions as table 500 except that the contents are different. The contents of the cells in FIG. 5B correspond to the values of utterance 1 in FIG. 6.

Referring to FIG. 6 there is shown a table of data returned by the voice recognition engine for three different utterances of the same words "Four three two one". Utterance 1 is spoken slowly, utterance two is spoken normally and utterance 3 is spoken quickly.

Six values are returned for each word in the utterance. For utterance 1 and word "four", the speech recognition engine 118 returns the spelling "4"; the score 50% (which in this case is below the lower threshold recognition score of 60%); the start time 170 msec.; the end time 870 msec.; the actual duration (end time–start time=700 msec.); and the ideal duration 350 msec. Similar results are returned for the remaining words in utterance 1, notice that in each case the actual duration of the word is greater than the ideal duration. In the results for utterance 2 notice that the actual duration is of order of the ideal duration for each word. In the results for utterance 3 notice that the actual duration is less than the ideal duration.

Example: John Smith, the user, phones his telephone banking service to query his current account. The phone rings and the IVR answers and plays the first prompt. The IVR prompts "please speak your customer identification number". The user then utters his four digit id number, "Eight, seven, six, five".

The user's utterance is sent to the speech recognition engine which creates recognition scores and durations for each recognized word (table 500). One word at a time the recognition scores (table 500 column B) are checked, and all found to be above the lower threshold recognition score 60%. Their actual durations (table 500 column C) compared to that of ideal word durations (table 500 column D) to produce individual duration ratio (table 500 column B). The average of the duration ratios is shown in table 500 Cell B6 and is less than one at 0.78. This means that the actual utterance was shorter than the ideal and the user is speaking quicker than the ideal. All the words were successfully recognized (recognition score above 60%) and the average duration ratio is less than the de minimus value of 0.80 so the application prompts the user to speak more slowly next time. Since the all the words were successfully recognized the application does not re-acquire the utterance at this time.

Next, the IVR prompts, "Please speak your password for account eight, seven, six, five and remember to speak a little slower." The user responds, "four, three, two, one."

The user's utterance is sent to the speech recognition engine which creates recognition scores and durations for each recognized word and places them in the utterance database (table 502). One word at a time the recognition score is checked and the score for the first word is found to be lower than the lower threshold recognition score. Ignoring this first word, the duration ratio for the actual and ideal durations for the remaining three words are found (table 502 column E). This time the actual duration for saying the three words is greater than the ideal duration and this indicates that the user is speaking too slowly.

From table 502 the duration ratios of the actual duration (Column C) and the ideal duration (column D) for the last three words (column C) is 2.1, 1.9, and 1.7 (column B) which averages 1.9 (Cell E6). Therefore the actual duration for the recognized words is greater than the ideal duration and the user is speaking slower than the ideal. Since the recognition score for the first word is below the lower threshold recognition score (60%) then re-acquisition of the utterance is necessary.

IVR prompts, "Please speak your password again, remembering to speak slightly slower this time." The user responds with "Four, three, two, one" which hopefully results in a better recognition score and a speed of utterance nearer the ideal.

The user's re-acquired utterance is sent to the speech recognition engine which creates recognition scores and durations for each recognized word as before. If the recognition score for the individual words are above the lower threshold recognition score (60%) then the application continues as normal with the rest of the voice application.

Although the embodiment has been described in terms of an IBM™ IVR for AIX™ other IVR's can be used to implement the invention. For instance IBM WebSphere™ Voice Response for Windows NT™ and Windows 2000™ with DirectTalk™ Technology is an interactive voice response (IVR) product that is for users who prefer a Windows™ based operating environment to run self-service applications. WebSphere™ Voice Response is capable of supporting simple to complex applications and can scale to thousands of lines in a networked configuration. Windows™, Windows 2000™ and Windows NT™ are trademarks of Microsoft Corporation in the United States, other countries, or both.

The preferred embodiment uses State Table application layer but other embodiments could be implemented in Java or VoiceXML by following the same principles.

Column E, cell B6, cell E6 in tables 500 and 502 are, in this embodiment, only constructs for the purposes of illustration. The duration customer server performs the calculations and stores the values in global or internal variables rather than the utterance database. In another embodiment these values may be stored in the utterance database.

In this embodiment a duration ratio is used to determine the need to prompt for utterance speed and whether to prompt for too fast or too slow. In another embodiment different comparisons between the ideal and the actual duration may be made as long as a magnitude and direction is apparent.

In summary there is disclosed an interactive voice response system, method and computer program product for prompting a user with speech speed feedback during speech recognition. A user who speaks too slowly or too quickly may speak even more slowly or quickly in response to an error in speech recognition. The present system aims to give the user feedback on the speed of speaking. The method includes: acquiring an utterance from a user; recognizing a string of words from the utterance; acquiring for each word the ratio of actual duration of delivery to ideal duration; calculating an average ratio for all the words wherein the average ratio is an indication of the speed of the delivery of the utterance; and prompting the user as to the speed of delivery of the utterance according to the average ratio.

What is claimed is:

1. An interactive response system comprising:
   means for acquiring an utterance from a user;
   means for recognizing a plurality of words from the utterance and associating a recognition score with each of the recognized words;
   means for acquiring for each of the recognized words an actual duration of delivery and an ideal duration of delivery;
   means for calculating for each of the recognized words a ratio of the actual duration and the ideal duration;
   means for computing an average ratio for the utterance as an indication of a speed of delivery of the utterance, wherein the average ratio is equal to the average of the calculated ratios for each of the recognized words associated with a recognition score above a lower threshold recognition score; and
   means for prompting the user as to the speed of delivery of the utterance according to the results of the computing of the average ratio.

2. The system of claim 1, wherein the means for prompting further comprises:
   means for prompting the user that the utterance has been delivered too slow if the actual duration is greater than the ideal duration; and
   means for prompting the user that the utterance has been delivered too fast if the actual duration is less than the ideal duration.

3. A system as in claim 1 wherein the means for prompting the user only operates if the actual duration and the ideal duration differ by more than a de minimus value.

4. A method in an interactive response system comprising:
   acquiring an utterance from a user;
   recognizing a plurality of words from the utterance and associating a recognition score with each of the recognized words;
   acquiring for each of the recognized words an actual duration of delivery and an ideal duration of delivery;
   calculating for each of the recognized words a ratio of the actual duration and the ideal duration;
   computing an average ratio for the utterance as an indication of a speed of delivery of the utterance, wherein the average ratio is equal to the average of the calculated ratios for each of the recognized words associated with a recognition score above a lower threshold recognition score; and
   prompting the user as to the speed of delivery of the utterance according to the results of the computing step comparison.

5. The method of claim 4, the step of prompting further comprising:
   prompting the user that the utterance has been delivered too slow if the actual duration is greater than the ideal duration; and
   prompting the user that the utterance has been delivered too fast if the actual duration is less than the ideal duration.

6. The method of claim 4, the step of prompting further comprising:
   prompting the user only if the actual duration and the ideal duration differ by more than a de minimus value.

7. A computer program product for processing one or more sets of data processing tasks, said computer program product comprising computer program instructions stored on a computer-readable storage medium for, when loaded into a computer and executed, causing a computer to carry out the steps of:
   acquiring an utterance from user;

recognizing a plurality of words from the utterance and associating a recognition score with each of the recognized words;

acquiring for each of the recognized words an actual duration of delivery and an ideal duration of delivery;

calculating for each of the recognized words a ratio of the actual duration and the ideal duration;

computing an average ratio for the utterance as an indication of a speed of delivery of the utterance, wherein the average ratio is equal to the average of the calculated ratios for each of the recognized words associated with a recognition score above a lower threshold recognition score; and prompting the user as to the speed of delivery of the utterance according to the results of the computing step.

8. The computer program product of claim 7, the step of prompting further comprising computer instructions:

prompting the user that the utterance has been delivered too slow if the actual duration is greater than the ideal duration; and prompting the user that the utterance has been delivered too fast if the actual duration is less than the ideal duration.

9. The computer program product of claim 7, the step of prompting further comprising computer instructions for:

prompting the user only if the actual duration and the ideal duration differ by more than a de minimus value.

* * * * *